United States Patent Office 3,347,818
Patented Oct. 17, 1967

3,347,818
METHYL METHACRYLATE COMPOSITIONS CONTAINING HALOGEN SUBSTITUTED ACID ALKYL ESTERS OF ORTHOPHOSPHORIC ACID
King Lau Howe, Wilmington, Del., assignor to E. I. du Pont de Nemours and Company, Wilmington, Del., a corporation of Delaware
No Drawing. Filed Nov. 30, 1962, Ser. No. 241,134
9 Claims. (Cl. 260—41)

This invention relates to polymethyl methacrylate compositions which are weather-resistant and highly flame-resistant. More particularly, this invention relates to polymethyl methacrylate compositions reinforced with glass mats which are weather-resistant and highly flame-resistant. This invention also relates to acrylic polymer-in-monomer solutions and monomer mixtures containing ingredients that will render products, produced from solutions resistant to weathering and highly flame-resistant.

It is known in the art to produce plastic compositions of decreased flammability by adding phosphorus containing compounds to the plastic. The addition of acid phosphorus compounds to methyl methacrylate containing compositions severely decreases the weatherability of the compositions, while the addition of neutral compounds is ineffective except at very high levels of addition. The decrease in weatherability of the acid containing compositions is particularly evident in applications where the resin is reinforced with glass fibers, for moisture tends to permeate the resin and cause separation of the resin from the fibers resulting in a whitening of the product.

It is an object of the present invention to overcome the above difficulties. It is a further object to provide a reinforced glass laminate which is highly flame-retardant and weatherable. It is a further object of this invention to provide a polymer-in-monomer solution containing flame retardants that can be formed into products that are weatherable. It is a further object of this invention to provide acrylic polymer-in-monomer solutions which may be formed into solid articles which are at least as flame-resistant as prior art compositions, and which have weathering properties which are superior to flame-resistant prior art compositions. It is a further object of this invention to provide acrylic monomer mixtures which may be formed into solid articles which are at least as flame-retardant as prior art compositions and which have superior weather-resistant properties. Other objects will be apparent to one skilled in the art from the remainder of the specification.

The above objects are accomplished and the above difficulties are overcome by adding to methyl methacrylate compositions halogen substituted acid alkyl esters of orthophosphoric acid, which esters have the formula:

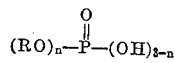

wherein $n=1$ or 2, $R=$halogenated alkyl groups having 1 to 6 carbon atoms, and the halogen in said halogenated alkyl group is selected from the class consisting of bromine and chlorine. In the preferred composition at least 30% by weight of the halogen is bromine, the total amount of halogen in said ester being from 16 to 80% by weight of ester. The desired objects may also be accomplished by adding a halogen substituted acid alkyl ester of orthophosphoric acid, having the formula just described, and a neutral halogen substituted organo phosphorus compound, the organo radical(s) of which have 1 to 10 carbon atoms each. The neutral phosphorus compound used in combination with the halogen substituted acid ester is preferably a phosphonate or a phosphate and is preferably pentavalent. The halogen content of the neutral halogen substituted organo compound is from 16 to 80% by weight of the compound, the halogen in the neutral organo compound being at least one halogen selected from the class consisting of bromine and chlorine; preferably, at least 30% by weight of the halogen is bromine.

The phosphorus compounds should be present to the extent of about 10 to 35 weight percent of the polymer-in-monomer solution, preferably between 10 and 25 weight percent. Between 1 and 100 percent by weight by the total phosphorus compound present should be halogen substituted alkyl acid ester of orthophosphoric acid.

Although the superior weatherability of articles produced from the polymer-in-monomer solutions containing the acid phosphorus compounds just described is readily apparent when unreinforced samples cast from the solution are subjected to alternating conditions of high humidity and ultraviolet light, the superior weatherability is even more apparent when the resin is reinforced with glass fibers.

Glass mats suitable for use as reinforcing agents for the products of this invention are those commercially available, for example glass mats made of chopped glass strands or continuous glass strands. Such mats have a density of about ¾-oz. to about 2 oz. per square foot. Each glass strand of the mat is made up of filaments having diameters of .00018 inch to .0004 inch; usually, there are about 102 to 204 filaments in each glass strand.

The glass reinforced products of this invention usually contain between 15 and 40% by weight glass, although the amount of glass is not critical.

Polymer-in-monomer solutions useful in making the products of this invention have viscosities of .5 to 25 poise, preferably between .5 and 3 poise. In order to avoid high exotherm during polymerization of the polymer-in-monomer solution to solid articles, it is desirable to have a polymer content of above about 20% in the solution. A 20% polymer content in the solution can be readily achieved by using chain transfer agents. Techniques for the production of such polymer-in-monomer solutions are well known in the art, for example, see British Patent 870,119, issued Oct. 4, 1961, and Canadian Patent 630,646, issued Nov. 7, 1961. Useful polymer-in-monomer solutions may be made by merely dissolving polymer in methyl methacrylate monomer. The polymer-in-monomer solutions may contain other polyunsaturated compounds as crosslinking agents, copolymers of methyl methacrylate and other vinyl monomers containing more than 75% methyl methacrylate and dyes, pigments, fillers, and the like.

In the following examples which illustrate the invention, all parts and percentages are by weight unless otherwise stated.

EXAMPLE I

A polymer-in-monomer solution having a viscosity of 5 poises was produced by dissolving 30 parts of polymethyl methacrylate having an inherent viscosity of 0.355 in 70 parts methyl methacrylate monomers and 1.25 parts of ethylene glycol dimethacrylate monomer (a crosslinking agent). To 78 parts of this solution, 18 parts tris(bromochloropropyl)phosphate, 4 parts of mono(bromoethyl) dihydrogen phosphate and 1.5 parts lauroyl peroxide (a polymerization initiator) were added. The solution was thoroughly mixed and then used to impregnate a laminate assembly consisting of a continuous multi-filament aluminum borosilicate glass mat randomly deposited in a swirl pattern, each filament being $5 \times 10^{-4}$ in. in diameter and there being 204 filaments in each multi-filament strand, said mat having a weight of about 1¾ oz. per. sq. ft. sandwiched between two continuous monofilament surfacing veils having a nominal thickness of $5 \times 10^{-3}$ in. The fibers of the mat and the veil were held together by polymethyl methacrylate binder. The polymer-in-monomer impregnated assembly was pressed between cellophane films at 10 p.s.i. for 10 minutes at 100° C. The resulting laminate contained 25% by weight glass fibers and had a Barcol Hardness of 38 and an average flame spread index of 39 when tested according to ASTM Method E–162–61T. The resistance of the laminate to moisture-induced delamination was tested by immersion of the laminate in water at 50° C. for one week. The laminate delaminated very slightly and only to about the same extent as a laminate made under the same conditions but containing no phosphorus compound.

EXAMPLE II

The process of Example I was repeated using the polymer-in-monomer solution of Example I, except that 12% mono(bromoethyl) dihydrogen phosphate was added as the sole phosphorus compound. The resulting laminate had a flame spread index of about 60 as measured by ASTM Method E–162–61T. The laminate was moderately affected by immersion in water at 50° C. for one week, that is there was a moderate amount of fiber whitening.

For purposes of comparison, a laminate having the same flame spread index, i.e. 60, was produced with ethyl dihydrogen phosphate. 17% by weight ethyl dihydrogen phosphate was added to the polymer-in-monomer solution of Example I as the sole phosphorus compound. The laminate was severely affected when immersed in water at 50° C. for one week, that is, there was severe fiber whitening as well as severe whitening of the resin itself.

EXAMPLE III

The process of Example I was repeated using the polymer-in-monomer solution described in Example I, except that an unhalogenated alkyl acid phosphate was employed, namely a 1 to 1 mixture of mono- and di-butyl acid phosphate in the amount of 3 parts. The resulting laminate had a flame spread index of 60 when measured according to ASTM Method E–162–61T. The product was placed in water at 50° C. for one week. The laminate became hazy; there was extensive fiber whitening, and delamination was evident.

EXAMPLE IV

The process of Example I was repeated using 3.5 parts of an one to one mixture of mono and bis chloroethyl acid phosphate, and 18.5 parts of tris(chlorobromopropyl) phosphate. The resulting laminate had a glass content of about 25% and had a flame spread index of 52.

EXAMPLE V

The process of Example I was repeated using a polymer-in-monomer sirup having a viscosity of 20 poise at 25° C., a polymer content of 35%, an inherent viscosity of about .32 (this polymer-in-monomer solution may be made by the process disclosed in British Patent 870,119), 6 parts of a one to one mixture of mono and bis(bromochloropropyl) acid phosphate, and 16 parts bis(dibromopropyl) phosphonate. .5 parts of benzoyl peroxide was used to polymerize the polymer-in-monomer solution to a solid laminate. The solid laminate had a flame spread index of 33 and did not whiten appreciably when immersed in water at 50° C. for one week.

EXAMPLE VI

A homogeneous mixture of 80 parts methyl methacrylate monomer, 0.73 part lauryl mercaptan, 3.5 parts monobromo ethyl dihydrogen phosphate and 18.5 parts of the reaction product of acetaldehyde and the reaction product of phosphorus trihalide with alkylene oxide, which product has the formula

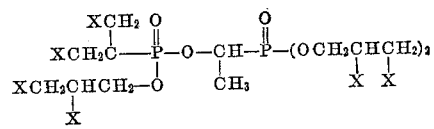

where X is a halogen atom selected from the group consisting of chlorine and bromine, was produced by stirring the components together. The mixture was then used to impregnate a glass reinforcing sandwich (as described in Example I). The glass reinforcing sandwich had been previously treated with 0.04 parts of alpha, alpha azobisisobutyronitrile. The mixture was then polymerized at 80° C. to form a solid article. The laminate had a flame spread index of 37 as measured by ASTM Method E–162–61T.

EXAMPLE VII

The process of Example VI was repeated using 5 parts mono(bromohexyl)dihydrogen phosphate instead of the mono(bromoethyl)dihydrogen phosphate. The flame spread index of the resulting laminate was 45. The product showed practically no discoloration when immersed in water at 50° C. for one week.

I claim:
1. A composition comprising a methacrylate of the class consisting of methyl methacrylate monomer, polymer-in-monomer solution of polymethyl methacrylate in methyl methacrylate monomer, and solid polymethyl methacrylates; and at least one halogenated phosphorus compound selected from the class consisting of halogen substituted acid alkyl esters of orthophosphoric acid formula

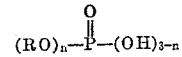

where $n$ is 1 to 2 and R is a halogenated alkyl group having 1 to 6 carbon atoms, and neutral halogen substituted organo phosphorus compounds, the total amount of phosphorus compound present being from 10 to 35% by weight of the acrylate, at least 1% by weight of the total phosphorus compound present being halogen substituted acid alkyl esters of orthophosphoric acid.

2. The composition of claim 1 in which the halogen of the halogenated phosphorus compound is selected from the class consisting of bromine and chlorine, and in which the halogen comprises 16 to 80% by weight of the halogenated phosphorus compound.

3. The composition of claim 2 in which the methacrylate monomer.

4. The composition of claim 2 in which the methacrylate is polymer-in-monomer solution of polymethyl methacrylate in methyl methacrylate monomer.

5. The composition of claim 2 in which the methacrylate is polymethyl methacrylate.

6. The composition of claim 2 in which the alkyl groups of the halogen substituted acid alkyl ester of orthophosphoric acid contain between 1 and 6 carbon atoms.

7. The composition of claim 1 in which the neutral halogen substituted organo phosphorus compounds are pentavalent and selected from the class consisting of phosphates and phosphonates.

8. The composition of claim 7 in which the neutral halogen substituted organo phosphorus compounds contain 1 to 10 carbon atoms in each organo radical.

9. The composition of claim 1 which also contains up to 40% by weight glass fibers.

References Cited

UNITED STATES PATENTS

| | | | |
|---|---|---|---|
| 2,500,023 | 3/1950 | Burk | 260—41 |
| 2,703,776 | 3/1955 | Leader | 260—45.5 |
| 3,058,941 | 10/1962 | Birum | 260—45.7 |
| 3,251,785 | 5/1966 | Anderson | 260—2.5 |

MORRIS LIEBMAN, *Primary Examiner.*

K. B. CLARKE, J. DERRINGTON, *Assistant Examiners.*

UNITED STATES PATENT OFFICE
CERTIFICATE OF CORRECTION

Patent No. 3,347,818                      October 17, 1967

King Lau Howe

It is hereby certified that error appears in the above numbered patent requiring correction and that the said Letters Patent should read as corrected below.

Column 4, line 46, after "orthophosphoric acid" insert -- having the --; line 68, before "monomer" insert -- is methyl methacrylate --.

Signed and sealed this 4th day of February 1969.

(SEAL)
Attest:

Edward M. Fletcher, Jr.                      EDWARD J. BRENNER
Attesting Officer                             Commissioner of Patents